Figure 1:
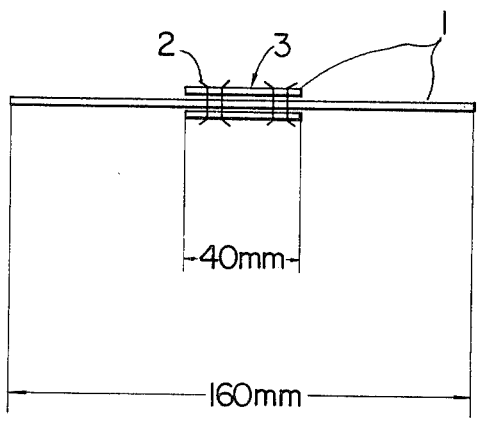

United States Patent [19]

Aimono et al.

[11] 4,104,215

[45] Aug. 1, 1978

[54] ODORLESS OR LOW-ODOR RESINOUS COMPOSITION

[75] Inventors: Yuji Aimono; Eiji Omori; Mineo Nakano, all of Hitachi, Japan

[73] Assignee: Hitachi Chemical Company, Ltd., Japan

[21] Appl. No.: 692,953

[22] Filed: Jun. 4, 1976

[30] Foreign Application Priority Data

May 12, 1975 [JP] Japan .................................... 50-56852

[51] Int. Cl.$^2$ .......................... C09D 3/58; C09D 3/66; C09D 5/25

[52] U.S. Cl. .......................... 260/22 CB; 260/22 EP; 260/23 EP; 260/23 P; 260/23.7 R; 260/872; 260/879; 260/885

[58] Field of Search ............ 260/23.7 R, 23 P, 23 EP, 260/22 EP, 22 CB, 872, 879, 885

[56] References Cited

U.S. PATENT DOCUMENTS

| | | | |
|---|---|---|---|
| 2,407,479 | 9/1946 | D'Alelio | 260/22 CB |
| 2,957,837 | 10/1960 | Smith et al. | 260/22 CB |
| 3,224,989 | 12/1965 | Nevin | 260/23 EP |
| 3,247,143 | 4/1966 | Masters et al. | 260/23 EP |
| 3,629,172 | 12/1971 | Jones | 260/23.7 R |
| 3,639,500 | 2/1972 | Muny et al. | 260/23.7 R |
| 3,650,997 | 3/1972 | Weisfeld et al. | 260/22 EP |
| 3,674,893 | 7/1972 | Nowak et al. | 260/23.7 R |
| 3,713,864 | 1/1973 | Ackerman et al. | 260/23 EP |
| 3,878,148 | 4/1975 | Gillan et al. | 260/22 EP |
| 3,890,259 | 6/1975 | Montesissa et al. | 260/23 P |

*Primary Examiner*—Ronald W. Griffin
*Attorney, Agent, or Firm*—Craig & Antonelli

[57] ABSTRACT

A resinous composition comprising (a) a low-odor crosslinkable monomer obtained by reacting a glycidyl ester of synthetic or vegetable oil fatty acid with acrylic acid or methacrylic acid with heating, and (b) a polybutadiene modified by acrylic acid or methacrylic acid or an unsaturated polyester resin produces almost no or very little odor in the state of a varnish and at drying or curing. Said composition can produce varnishes excellent in mechanical and electrical properties.

20 Claims, 2 Drawing Figures

ODORLESS OR LOW-ODOR RESINOUS COMPOSITION

This invention relates to an odorless or very little odor-producing resinous composition.

Heretofore unsaturated polyester varnishes have widely been used for impregnating coils, etc. due to their comparatively balanced good properties such as mechanical properties, electrical properties, heat resistance, workability, cost, and the like. But since the unsaturated polyester varnishes, particularly styrene monomer being used as a cross-linkable monomer, cause public hazard due to odor and air pollution particularly at the curing, prevention of such hazard and air pollution and waste of resources has long been desired. More in detail, the unsaturated polyester varnishes comprise mainly the resin and a cross-linkable monomer, the latter being included in an amount of 40 to 60% by weight. As the crosslinkable monomer, that having a comparatively low molecular weight and being comparatively volatile is used from the viewpoint of various physical properties and economy. Due to the volatile crosslinkable monomer, about 10 to 30% by weight of the varnish volatilizes in the state of a varnish and during the curing, which gives unfavorable odor to the workers and neighboring residents. This also causes the problem of waste of valuable resources.

In order to solve such a problem, various proposals have been made, for example, a method for burning the crosslinkable monomer, a method for adsorbing the volatile matters with an adsorbent, and the like but they are insufficient.

It is an object of the present invention to provide a resinous composition producing almost no odor in the state of a varnish and at the curing and volatilizing a very small amount of crosslinkable monomer at the curing, while giving excellent electrical and mechanical properties to shaped articles.

The present invention provides a resinous composition comprising (a) a low-odor crosslinkable monomer obtained by reacting a glycidyl ester of synthetic or vegetable oil fatty acid with acrylic acid or methacrylic acid with heating, and (b) a polybutadiene modified by acrylic acid or methacrylic acid or an unsaturated polyester resin.

The low-odor crosslinkable monomer is obtained by reacting a glycidyl ester of synthetic or vegetable oil fatty acid with acrylic acid or methacrylic acid with heating at a temperature of preferably 90° to 130° C, more preferably 100° to 120° C for preferably 2 - 10 hours, more preferably 3 - 5 hours. As the synthetic fatty acids, a saturated synthetic tertiary monocarboxylic acid having $C_9$, $C_{10}$, and $C_{11}$ chain length can be used. As the vegetable oil fatty acids, linseed oil fatty acid, soya oil fatty acid, dehydrated castor oil fatty acid, rice bran oil fatty acid, coconut oil fatty acid, and the like can be used. Examples of glycidyl esters of synthetic or vegetable oil fatty acids are Cardura E (manufactured by Shell Chemical Corp.), and the like. The reaction of the glycidyl ester of synthetic or vegetable oil fatty acid with acrylic acid or methacrylic acid can be carried out, if necessary, in the presence of an esterification catalyst such as a secondary, tertiary or quaternary amine, an ammonium salt, imidazol or a derivative thereof, etc. (e.g. dimethylamine, diethylamine, methylethylamine, triethylamine, triethanolamine, dimethylbenzyltetradecylammonium chloride, 2-ethyl-4-methyl-imidazol) and a polymerization inhibitor such as hydroquinone, p-t-butylcatechol, pyrogallol, preferably in the air. Preparation of the low-odor crosslinkable monomer can be represented by the following equation:

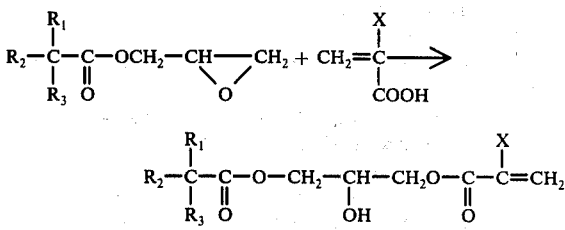

wherein $R_1$, $R_2$ and $R_3$ are individually a hydrogen atom or a hydrocarbon radical such as having 1 to 20 carbon atoms, and X is hydrogen or methyl.

More concretely, the low-odor crosslinkable monomer can be prepared, for example, by charging 86 g of methacrylic acid, 228 g of Cardura E and 0.06 g of hydroquinone (0.02% by weight based on the charged amount) in a four-necked flask and reacting in the air at 110° C for 5 hours. The resulting crosslinkable monomer has an acid value of 23.2 and a viscosity of 0.5 poise (at 25° C). Other examples of preparing the low-odor crosslinkable monomers are shown in the working examples below.

The polybutadiene modified by acrylic acid or methacrylic acid is a polybutadiene resin having reactive double bonds at the end groups obtained by introducing active groups at the ends of the polybutadiene and reacting the active groups with the carboxyl groups of acrylic acid or methacrylic acid. Examples of the modified polybutadienes are a polybutadiene resin modified by methacrylic acid, e.g. TE-2000 (manufactured by Nippon Soda Co., Ltd., Japan), and the like. There can also be used a polybutadiene resin obtained by urethanizing a polybutadiene resin having hydroxylated end groups, e.g. G-1000, G-2000, and G-3000 (manufactured by Nippon Soda Co., Ltd., Japan), with a diisocyanate such as tolylenediisocyanate and reacting the isocyanate radical at one end group with 2-hydroxyethyl methacrylate or 2-hydroxypropyl methacrylate.

As the unsaturated polyester resins, an alternative component (b) of the resinous composition of the present invention, those obtained from the following components, i.e. an alcohol component, an acid component, and if necessary, a modifying component can be used.

(I) ALCOHOL COMPONENT

Propylene glycol, ethylene glycol, dipropylene glycol, diethylene glycol, 1,3-butanediol, neopentyl glycol, 1,6-hexanediol, glycerin, trimethylolpropane, pentaerythritol, etc.

(II) ACID COMPONENT

Unsaturated acids such as maleic acid, maleic anhydride, fumaric acid, etc.

Saturated acids such as phthalic acid, phthalic anhydride, isophthalic acid, terephthalic acid, tetrahydrophthalic acid, tetrahydrophthalic anhydride, hexahydrophthalic acid, hexahydrophthalic anhydride, endomethylenetetrahydrophthalic anhydride, adipic acid, sebacic acid, etc.

(III) MODIFYING COMPONENT

Fatty acids of linseed oil, soya oil, tall oil, dehydrated castor oil, coconut oil, and the like fatty acids, and dicyclopentadiene, etc. There may generally be used commercially available unsaturated polyester resins preferably having 98% or more of nonvolatile content, e.g. unsaturated polyester resin modified by soya acid (PS-203) manufactured by Hitachi Chemical Co., Ltd., Japan).

The resinous composition of the present invention contains preferably 100 parts by weight of the component (a) and 10 to 1000 parts by weight, more preferably 20 to 400 parts by weight of the component (b).

The resinous composition of the present invention may further contain a curing agent, a curing accelerator, and if required, crosslinkable monomers, modifying resins, polymerization inhibitors, and other conventional additives such as pigments, mineral fillers and the like.

As the curing agents, there may be used acyl peroxides such as benzoyl peroxide, acetyl peroxide, etc.; hydroperoxides such as t-butyl hydroperoxide, cumene hydroperoxide, etc.; ketone peroxides such as methyl ethyl ketone peroxide, cyclohexanone peroxide, etc.; dialkyl peroxides such as di-t-butyl peroxide, dicumyl peroxide, etc; oxyperoxides such as t-butyl perbenzoate, t-butyl peroxyacetate, etc.

The curing agent may generally be used in an amount of 0.5 to 5% by weight, preferably 1 to 3% by weight based on the weight of the resinous composition.

As the curing accelerators, conventional metal (e.g. Co, Mn, Fe, Pb, or the like) salts of naphthenates or octoates can be used in an amount of up to 2.0% by weight based on the weight of the resinous composition.

As the crosslinkable monomers, those having high boiling points other than the low-odor crosslinkable monomer as mentioned above may be used, if desired. Examples of such monomers are esters of acrylic acid or methacrylic acid such as lauryl methacrylate, tridecyl methacrylate, 2-ethylhexyl methacrylate, triethylene dimethacrylate, and the like, allyl ethers of trimethylolpropane, glycerin, and the like, diallyl phthalate, diallyl isophthalate, triallyl isocyanurate, and the like.

As the modifying resins, saturated polyester resins, polybutadiene resins, and the like may be used in an amount of 10 to 50 parts by weight, preferably 20 to 40 parts by weight per 100 parts by weight of the component (a).

As the polymerization inhibitors, conventional ones such as quinones, e.g. hydroquinone, p-t-butyl catechol, pyrogallol, and the like may be used in an amount of 0 to 0.1% by weight based on the weight of the resinous composition.

Examples of preferable resinous compositions of the present invention are (1) 100 parts by weight of the low-odor crosslinkable monomer, 20 to 400 parts by weight of unsaturated polyester resin and 0 to 500 parts by weight of diallyl phthalate; (2) 100 parts by weight of the low-odor crosslinkable monomer, 0 to 100 parts by weight of lauryl methacrylate and 20 to 100 parts by weight of polybutadiene resin modified by methacrylic acid; and the like.

The resinous composition of the present invention produces almost no odor or very little odor in the state of a varnish and at the curing, so that public hazard or air pollution due to odor or volatile matters of conventional varnishes does not occur when the present resinous composition is used. Further since the present resinous composition can produce shaped articles having excellent electrical and mechanical properties, it can be used for casting electric devices, impregnating or drip-impregnating (Trickle method) electric devices, and the like.

The invention is illustrated more particularly by way of the following examples.

REFERENTIAL EXAMPLE (1) Preparation of low-odor crosslinkable monomer (A)

In a 2 l four-necked flask equipped with a stirrer, a thermometer and a condenser, 1000 g of Cardura E (epoxy equivalent 245, manufactured by Shell Chemical Corp.), 344 g of methacrylic acid and 0.27 g of hydroquinone were placed and the reaction was carried out at 120° C for 5 hours to give pale yellow liquid low-odor crosslinkable monomer (A) having an acid value of 20. After distilled under reduced pressure, the product had a boiling point of 185° C/4 mmHg and almost no odor. The viscosity at 25° C was 0.5 poise.

(2) Preparation of low-odor crosslinkable monomer (B)

Using the same apparatus as mentioned above, 1000 g of Cardura E, 310 g of methacrylic acid, 0.27 g of hydroquinone and 1.3 g of Cation $M_2$-1000 (manufactured by Nippon Yushi Co., Ltd. Japan, a quaternary ammonium salt) were reacted at 120° C for 3 hours to give pale yellow low-odor crosslinkable monomer (B) having an acid value of 25 and the viscosity at 25° C of 0.4 poise.

EXAMPLE 1

Varnish A was prepared by mixing 100 g of low-odor crosslinkable monomer (A), 50 g of TE-2000 (polybutadiene modified by methacrylic acid, manufactured by Nippon Soda Co., Ltd.), 1.5 g of t-butyl perbenzoate, 0.3 g of 6% cobalt naphthenate and 0.008 g of hydroquinone with stirring.

EXAMPLE 2

Varnish B was prepared by mixing 100 g of low-odor crosslinkable monomer (B), 50 g of PS-203 (unsaturated polyester resin modified by soya oil, resin content being 98.7% by weight, manufactured by Hitachi Chemical Co., Ltd.), 1.5 g of t-butyl perbenzoate, 0.3 g of 6% cobalt naphthenate and 0.008 g of hydroquinone with stirring.

EXAMPLE 3

Varnish C was prepared by mixing 462 g of low-odor crosslinkable monomer (A), 115 g of TE-2000, 115 g of a polybutadiene resin (Polybutadiene B-1000 manufactured by Nippon Soda Co., Ltd., number average molecular weight being 1000), 308 g of lauryl methacrylate, 10 g of t-butyl perbenzoate and 2 g of 6% cobalt napthenate with stirring.

EXAMPLE 4

In a four-necked flask, 72 g of acrylic acid, 228 g of Cardura E and 0.06 g of hydroquinone were placed and the reaction was carried out at 110° C for 5 hours in the air to give low-odor crosslinkable monomer (C) having an acid value of 23.2 and the viscosity at 25° C of 0.5 poise.

Varnish D was prepared by mixing 100 g of low-odor crosslinkable monomer (C), 50 g of TE-2000, 1.5 g of t-butyl perbenzoate, 0.3 g of 6% cobalt naphthenate and 0.008 g of hydroquinone with stirring.

EXAMPLE 5

In a four-necked flask, 280 g of soya oil fatty acid, 463 g of epichlorohydrin and 1 g of trimethylbenzyl ammonium chloride were placed and esterification was carried out under nitrogen gas at 100° C for 3 hours. After the reaction, a 50% aqueous solution of sodium hydroxide (48 g of NaOH and 48 g of water) was dropped into the reaction mixture at 100° C in 2 hours and the water was removed by azeotropic distillation. The temperature of the reaction product was cooled to room temperature and a 5% aqueous solution of sodium hydroxide was added to the reaction product, which was washed with water and further with an aqueous solution of sodium bisulfate once. The water layer was separated and the layer of the reaction product was washed with water twice. Then the reaction product was dried over sodium sulfate to give a liquid epoxy compound (epoxy equivalent 345). The epoxy compound (336 g), 86 g of methacrylic acid and 0.08 g of hydroquinone (0.02% by weight based on the charged amount) were placed in a four-necked flask and reacted in the air at 110° C for 5 hours to give liquid or viscous liquid of low-odor crosslinkable monomer (D) having an acid value of 18.5.

Varnish E was prepared by mixing 100 g of low-odor crosslinkable monomer (D), 50 g of TE-2000, 1.5 g of t-butyl perbenzoate, 0.3 g of 6% cobalt naphthenate and 0.008 g of hydroquinone with stirring.

COMPARATIVE EXAMPLE 1

For comparison, a typical unsaturated polyester varnish modified by soya oil (PS-202 manufactured by Hitachi Chemical Co., Ltd.) was used.

Odor and physical properties of Varnishes A to E and PS-202 were measured and the results were listed in Table 1.

Table 1

| Example No. | 1 | 2 | 3 | 4 | 5 | Comparative Example 1 *8 |
|---|---|---|---|---|---|---|
| Varnish | Varnish A | Varnish B | Varnish C | Varnish D | Varnish E | PS-202 |
| In the state of varnish Odor | Almost no odor | Almost no odor | Almost no odor | Almost no odor | Almost no odor | Irritating odor of styrene |
| At drying *1 | Slight odor | Slight odor | Slight odor | Slight odor | Slight odor | Strong irritating odor |
| Viscosity (at 25° C) (poise) *2 | 10.5 | 12.6 | 0.7 | 9.5 | 10.8 | 1.8 |
| Gel time (100° C, min.) *3 | 7.2 | 5.1 | 8.5 | 6.8 | 7.5 | 8.5 |
| Tensile strength (23° C, kg/mm$^2$) *4 | 0.3 | 0.2 | 0.03 | 0.3 | 0.2 | 0.3 |
| Elongation (23° C, %) *4 | 35 | 30 | 40 | 34 | 38 | 32 |
| Adhesive strength under shear (23° C, kg) *5 | 40 | 53 | 12 | 38 | 35 | 24 |
| Volume resistivity (23° C, Ω-cm) *6 | $3.4 \times 10^{14}$ | $1.2 \times 10^{13}$ | $2.4 \times 10^{14}$ | $1.2 \times 10^{14}$ | $2.4 \times 10^{14}$ | $2.0 \times 10^{12}$ |
| Volatile content (%) *7 | 2.8 | 3.0 | 2.7 | 2.7 | 3.2 | 12.5 |

Figure 2:
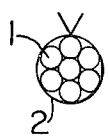

Note)
*1:A SA-type standard drier (450 × 350× 350 mm) was kept at 120° C and a tin container (100 × 100 × 20 mm) containing 30 g of each varnish was placed in the drier for 30 minutes. After that period, odor in the drier was judged with the nose.
*2:Viscosity was measured using a BL-type rotational viscometer.
*3:In a test tube with a diameter of 18 mm, a varnish was placed to the height of 70 mm and the time required for gelation was measured.
*4:Measured according to JIS K6301.
*5:Using polyester coated copper wire with a diameter of 20 mm, a test piece as shown in the attached drawings was made. The test piece was coated with a varnish and cured at 120° C for 3 hours to measure tensile strength. Fig. 1 is a front view of the test piece and Fig. 2 is a cross-sectional view of the test piece at a binded part. In the drawings 1 is polyester coated copper wire with a diameter of 2.0 mm, 2 is bind line with a diameter of 0.14 mm for biding the polyester coated copper wires, and 3 is a binded part.
*6:Using a resin plate of 20 mm thick and a ultrainsulation resistance meter, volume resistivity was measured applying 500 V thereto.
*7:In a metal laboratory dish having a diameter of 60 mm, 10 g of a varnish was placed and cured at 120° C for 1 hour to measure weight loss.
*8:As a curing agent, 1% by weight of benzoyl peroxide and as a curing accelerator, 1% by weight of PT-23 (manufactured by Hitachi Chemical Co., Ltd.) were used.

As is clear from Table 1, the resinous compositions of the present invention (Varnishes A to E) have almost no odor in the state of a varnish and slight odor at drying. Volatile contents of the present compositions are ¼ that of the conventional unsaturated polyester varnish. This means that the present composition can remarkably reduce air pollution and waste of resources. Concerning physical properties, Varnishes A, B, D and E show greater adhesive strengths under shear than the conventional unsaturated polyester varnish and also are excellent in electrical properties. Varnish C is an example having very low viscosity and inferior to the conventional unsaturated polyester varnish in mechanical properties but superior to the latter in electrical properties.

From the above results, it is clear that the resinous composition of the present invention can remarkably reduce odor of varnish and odor at drying as well as volatile amount comparing with the conventional unsaturated polyester varnish and further is excellent in mechanical and electrical properties.

EXAMPLE 6

Varnish F was prepared by mixing 100 g of low-odor crosslinkable monomer (A), 130 g of PS-203, 280 g of diallyl phthalate, 1.5 g of t-butyl perbenzoate, 0.3 g of 6% cobalt naphthenate and 0.008 g of hydroquinone with stirring.

EXAMPLE 7

Varnish G was prepared by mixing 100 g of low-odor crosslinkable monomer (A), 280 g of unsaturated polyester resin (obtained by reacting 202 g of dicyclopentadiene, 259 g of soya oil fatty acid, 170 g of maleic anhydride, 156 g of diethylene glycol and 112 g of propylene glycol at 200° C for 11 hours), 428 g of diallyl phthalate, 1.5 g of t-butyl perbenzoate, 0.3 g of 6% cobalt naphthenate and 0.008 g of hydroquinone with stirring.

Odor and physical properties of Varnishes F and G were measured as mentioned above and the results were listed in Table 2.

Table 2

| Example No. | 6 | 7 |
|---|---|---|
| Varnish | Varnish F | Varnish G |
| Odor In the state of varnish | Almost no odor | Almost no odor |
| At drying | Slight odor | Slight odor |
| Viscosity (at 25° C) (poise) | 1.4 | 1.0 |
| Gel time (100° C, min.) | 8.0 | — |
| Tensile strength (23° C, kg/mm$^2$) | 1.8 | 0.4 |
| Elongation (23° C, %) | 2.0 | — |
| Adhesive strength under shear (23° C, kg) | 38 | 34 |
| Volume resistivity (23° C, Ω-cm) | $8.3 \times 10^{15}$ | $5 \times 10^{14}$ |
| Volatile content (%) | 1.9 | 3.0 |

What is claimed is:

1. A resinous composition comprising (a) a low-odor crosslinkable monomer obtained by reacting a glycidyl ester of synthetic or vegetable oil fatty acid with acrylic acid or methacrylic acid with heating, and (b) a polybutadiene modified by acrylic acid or methacrylic acid or an unsaturated polyester resin.

2. A resinous composition according to claim 1, wherein the synthetic fatty acid is a saturated synthetic tertiary monocarboxylic acid having $C_9$, $C_{10}$ and $C_{11}$ chain length.

3. A resinous composition according to claim 1, wherein the vegetable oil is soya oil, dehydrated castor oil, rice bran oil, linseed oil, or coconut oil.

4. A resinous composition according to claim 1, wherein the low-odor crosslinkable monomer is represented by the formula:

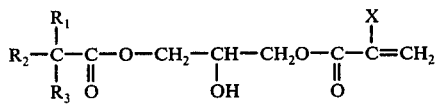

wherein $R_1$, $R_2$ and $R_3$ are independently a hydrogen atom or a hydrocarbon radical having 1 to 20 carbon atoms, and X is hydrogen or methyl.

5. A resinous composition according to claim 1, wherein the amount of the low-odor crosslinkable monomer is 100 parts by weight and the amount of the polybutadiene modified by acrylic acid or methacrylic acid or the unsaturated polyester resin is 10 to 150 parts by weight.

6. A resinous composition according to claim 1, which further contains at least one of a curing agent, a curing accelerator, a crosslinkable monomer other than the component (a), a modifying resin and a polymerization inhibitor.

7. A resinous composition according to claim 6, wherein the crosslinkable monomer is an ester of acrylic acid or methacrylic acid.

8. A resinous composition according to claim 6, wherein the modifying resin is a polybutadiene.

9. A resinous composition comprising (a) 100 parts by weight of a low-odor crosslinkable monomer obtained by reacting a glycidyl ester of synthetic or vegetable oil fatty acid with acrylic acid or methacrylic acid with heating, (b) 20 to 400 parts by weight of unsaturated polyester resin, and (c) 0 to 500 parts by weight of diallyl phthalate.

10. A resinous composition comprising (a) 100 parts by weight of a low-odor crosslinkable monomer obtained by reacting a glycidyl ester of a synthetic or vegetable oil fatty acid with acrylic acid or methacrylic acid with heating, (b) 20 to 100 parts by weight of a polybutadiene modified by methacrylic acid obtained by reacting a polybutadiene resin having hydroxylated end groups with a diisocyanate and further reacting the residual isocyanate radical with a hydroxyalkyl methacrylate, and (c) 0 to 100 parts by weight of lauryl methacrylate.

11. A resinous composition comprising (a) 100 parts by weight of a low-odor crosslinkable monomer obtained by reacting a glycidyl ester of a synthetic or vegetable oil fatty acid with acrylic or methacrylic acid with heating, and (b) 10 to 1000 parts by weight of an unsaturated polyester resin, a modified polybutadiene resin obtained by introducing an active group at the ends of a polybutadiene molecule and further reacting the active group with the carboxyl group of acrylic acid or methacrylic acid, or a modified polybutadiene resin obtained by reacting a hydroxyl-terminated polybutadiene with a diisocyanate and further reacting a residual isocyanate group of the resulting urethanized polybutadiene with a hydroxylalkyl acrylate or methacrylate.

12. A resinous composition according to claim 11, wherein component (b) is present in an amount of 20 to 400 parts by weight.

13. A resinous composition according to claim 11, further comprising a crosslinkable monomer other than component (a).

14. A resinous composition according to claim 13, wherein the crosslinkable monomer other than component (a) is a member selected from the group consisting of an ester of acrylic acid, an ester of methacrylic acid, trimethylolpropane, an allyl ether, and an allyl ester of a phthalate.

15. A resinous composition according to claim 14, wherein the crosslinkable monomer other than component (a) is diallyl phthalate.

16. A resinous composition according to claim 14, wherein the crosslinkable monomer other than component (a) is an ester of acrylic acid or methacrylic acid.

17. A resinous composition according to claim 11, further comprising at least one of a curing agent, a curing accelerator, a modifying resin and a polymerization inhibitor.

18. A resinous composition according to claim 11, wherein the synthetic fatty acid is a saturated synthetic tertiary monocarboxylic acid having $C_9$, $C_{10}$ and $C_{11}$ chain length.

19. A resinous composition according to claim 11, wherein the vegetable oil is soya oil, dehydrated castor oil, rice bran oil, linseed oil or coconut oil.

20. A resinous composition according to claim 11, wherein the low-odor crosslinkable monomer is represented by the formula:
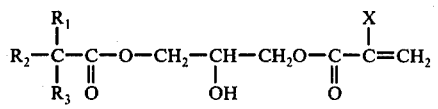
wherein $R_1$, $R_2$ and $R_3$ are independently a hydrogen atom or a hydrocarbon radical having 1 to 20 carbon atoms, and X is hydrogen or methyl.

UNITED STATES PATENT AND TRADEMARK OFFICE
CERTIFICATE OF CORRECTION

PATENT NO. : 4,104,215
DATED : August 1, 1978
INVENTOR(S) : Yuji Aimono; Eiji Omori; Mineo Nakano It is certified that error appears in the above-identified patent and that said Letters Patent are hereby corrected as shown below:

On the title page in the lefthand column, the following should be deleted:

[30] Foreign Application Priority Data

May 12, 1975 [JP]   Japan................50-56852

Signed and Sealed this

Nineteenth Day of May 1981

[SEAL]

*Attest:*

RENE D. TEGTMEYER

*Attesting Officer*    *Acting Commissioner of Patents and Trademarks*